(No Model.)
S. WATSON.
HOE.
No. 298,926. Patented May 20, 1884.
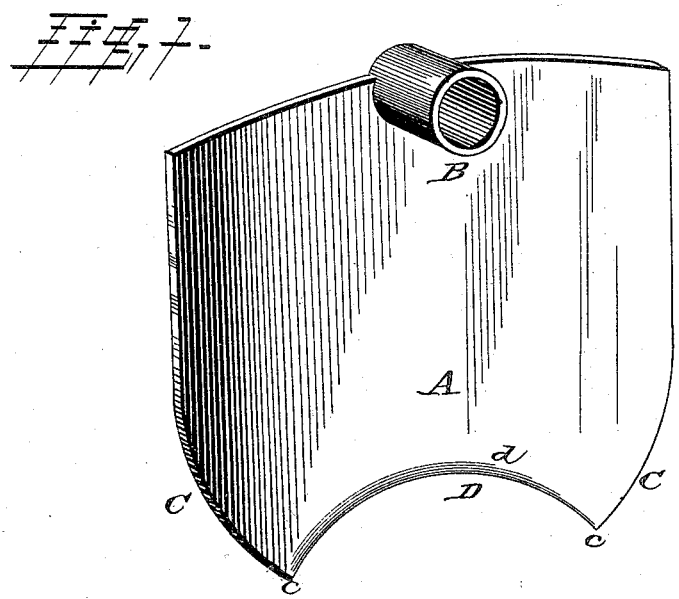
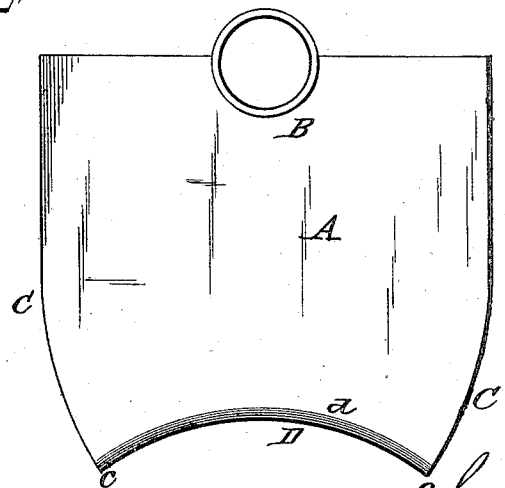
WITNESSES:
Fred. G. Dieterich,
Arthur L. Morsell
Samuel Watson,
INVENTOR.
By Louis Bagger & Co,
ATTORNEYS.

UNITED STATES PATENT OFFICE.

SAMUEL WATSON, OF MARION, SOUTH CAROLINA.

HOE.

SPECIFICATION forming part of Letters Patent No. 298,926, dated May 20, 1884.

Application filed February 19, 1884. (No model.)

*To all whom it may concern:*

Be it known that I, SAMUEL WATSON, a citizen of the United States, and a resident of Marion, in the county of Marion and State of South Carolina, have invented certain new and useful Improvements in Hoes; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved hoe, and Fig. 2 is a plan of the hoe-blade.

Similar letters of reference indicate corresponding parts in both the figures.

My invention has relation to hoes which are particularly adapted for cutting turf, digging ditch-banks, and similar work done in an earthy or peaty substance in which the decayed and decaying roots of grass and trees are frequently interspersed, making it difficult to do the work with a hoe of the ordinary description; and it consists in the construction of an improved turf-hoe, as hereinafter more fully described and claimed.

In the accompanying drawings, A is the blade of my improved hoe, and B the collar or socket by which it is fastened to the handle. The blade is slightly curved, as shown in the drawings, and rounded at its lower corners, C C. Its lower part is concaved, as shown at D, and provided with a sharp cutting-edge, the bevel or basil $d$ of which is cut from the inside toward the outside, so as to form the cutting-edge on the outer edge of the concave D. The advantage of this construction is that the concaved cutting-edge causes it to cut all small roots and similar impediments which come between the points $c\ c$ at the lower ends of the rounded corners C, instead of dodging the same, as where a straight-edged or pointed hoe is used; and by curving the blade, as shown, the turf or peat will stick to it much better than where a flat implement is used for the same class of work.

Having thus described my invention, I claim and desire to secure by Letters Patent of the United States—

As an improved article of manufacture, a turf-hoe or ditching-hoe having a curved blade cut away to form rounded corners, and having a concaved cutting-edge between the lower rounded corners, as and for the purpose shown and set forth.

In testimony that I claim the foregoing as my own I have hereunto affixed my signature in presence of two witnesses.

SAMUEL WATSON.

Witnesses:
    W. J. MONTGOMERY,
    M. FRANK.